(12) United States Patent
Jagtap

(10) Patent No.: US 10,936,495 B2
(45) Date of Patent: Mar. 2, 2021

(54) SEPARATE DATA REGISTERS AND CACHE REGISTERS IN MEMORY

(71) Applicant: Seagate Technology LLC, Cupertino, CA (US)

(72) Inventor: Sachin Sudhir Jagtap, Pune (IN)

(73) Assignee: SEAGATE TECHNOLOGY LLC, Fremont, CA (US)

(*) Notice: Subject to any disclaimer, the term of this patent is extended or adjusted under 35 U.S.C. 154(b) by 170 days.

(21) Appl. No.: 15/942,905

(22) Filed: Apr. 2, 2018

(65) Prior Publication Data
US 2019/0303296 A1 Oct. 3, 2019

(51) Int. Cl.
G06F 12/0842 (2016.01)
G06F 12/0855 (2016.01)
G06F 12/0895 (2016.01)
G06F 12/0846 (2016.01)

(52) U.S. Cl.
CPC .. *G06F 12/0842* (2013.01); *G06F 2212/1016* (2013.01)

(58) Field of Classification Search
None
See application file for complete search history.

(56) References Cited

U.S. PATENT DOCUMENTS

| 5,842,038 | A | * | 11/1998 | Williams | G06F 13/1642 710/5 |
| 6,005,742 | A | | 12/1999 | Cuningham et al. | |
| 6,741,417 | B2 | | 5/2004 | Hsin et al. | |
| 6,768,610 | B1 | | 7/2004 | Morris et al. | |
| 8,254,222 | B1 | | 8/2012 | Tang | |
| 9,536,553 | B1 | | 1/2017 | Seo et al. | |
| 9,601,143 | B1 | | 3/2017 | Seo et al. | |

* cited by examiner

*Primary Examiner* — Michael Alsip
(74) *Attorney, Agent, or Firm* — Holzer Patel Drennan

(57) ABSTRACT

Implementations disclosed herein include a system and method of storing one or more data and program data in a memory, temporarily storing the one or more data and the program data in a cache, managing the one or more data from the memory and the cache in a read data register and a read cache register, and managing the program data from the memory and the cache in a program data register and a program cache register, wherein each of the read data register and the read cache register are separate from the program data register and the program cache register. Read operations are performed only with the read data register and the read cache register. Program operations are performed only with the program data register and the program cache register.

14 Claims, 7 Drawing Sheets

SEPARATE DATA REGISTERS AND CACHE REGISTERS IN MEMORY

SUMMARY

In one implementation, the disclosed technology provides a system and method of storing one or more data and program data in a memory, temporarily storing the one or more data and the program data in a cache, managing the one or more data from the memory and the cache in a read data register and a read cache register, and managing the program data from the memory and the cache in a program data register and a program cache register, wherein each of the read data register and the read cache register are separate from the program data register and the program cache register. Read operations are performed only with the read data register and the read cache register. Program operations are performed only with the program data register and the program cache register.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

DETAILED DESCRIPTION

When operating in a cache mode, memory devices may use two registers: a data register and a cache register. During cache operations, the data register and the cache register operate independently in a pipe-lined fashion, to increase data throughput. This allows a memory to perform data transfer with a storage controller and access (e.g., read data or write data) the memory in parallel. The cache register stores data which the storage controller accesses to either transfer to the memory or to read data from the memory. The data register is used to either hold data for programming to the memory or to read data from the memory and cache. These parallel operations of data transfer and memory access occur only if the same commands come in sequential (one after the other) order. For example, the commands may occur either for multiple consecutive reads (e.g., cache read commands) or for multiple consecutive programs (e.g., cache program commands). There is no performance benefit for a read operation, followed by a program operation, or for a program operation, followed by a read operation because the operations then cannot occur in parallel. Thus, it can be time intensive for the memory to perform different commands sequentially (e.g., a program command followed by a read command or a read command followed by a program command).

The disclosed technology includes incorporating four registers into a data storage system for read operations and program operations to occur in parallel. Specifically, a data storage system may include a read data register, a read cache register, a program data register, and a program cache register. Thus, a separate pair of registers for read operations and program operations. The disclosed technology allows memory to overlap memory access and data transfer with a storage controller even when consecutive commands are different (e.g., a read command followed by a program command).

If the memory receives a read command followed by a program command or a program command followed by read command, then the overall time required for the two command completion is less. As a result, the performance of mix read-program commands (read followed by write and write followed by read) to memory is improved.

Figure 1:
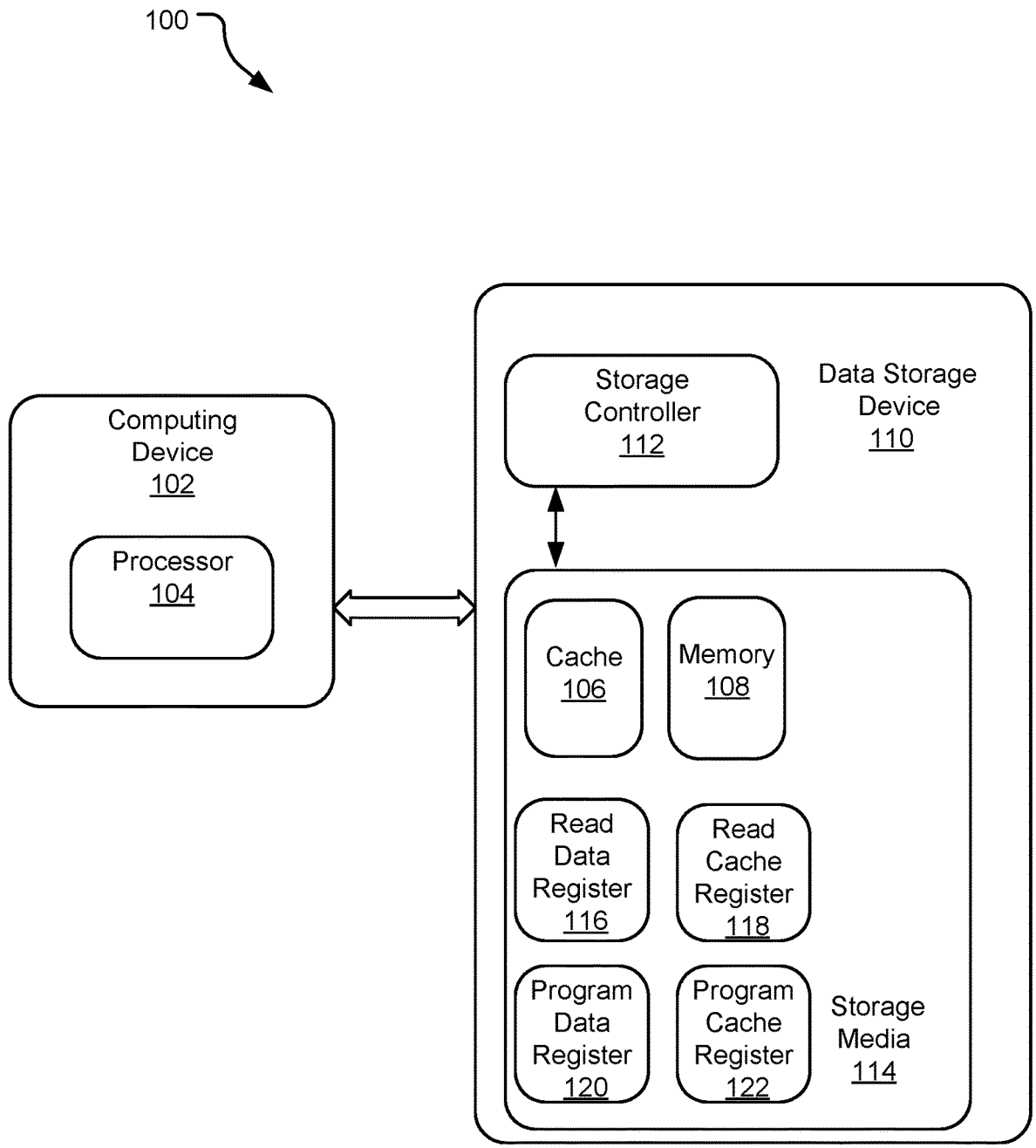
FIG. 1 is a block diagram of an example data storage system with separate data and cache registers.

FIG. 1 illustrates a block diagram of an example data storage system 100 with separate data and cache registers, showing various functional components used to control the operation of a data storage device 110 (e.g., an SMR HDD, an SMR SSHD, an object storage device, etc.). The system 100 includes a computing or host device 102 (e.g., a computer, a mobile device, the internet, etc.) operably connected to the data storage device 110, each of the host device 102 and the data storage device 110 communicating with each other.

A processor 104 is located in the host device 102. The processor 104 sends one or more read or write commands to a storage device controller 112 for execution. As control communication paths are provided between a host device 102 and the storage device controller 112, the storage device controller 112 provides communication and control for the data storage device 110.

A storage media 114 located in the data storage device 110 may be one or more of a variety of tangible media (excluding carrier waves and communication signals), including, for example, magnetic media, flash memory, optical media, random access memory (RAM), optical media, solid state media such as NAND, NVRAM, Resistive RAM (ReRAM), Magnetic RAM (MRAM), Phase Change Memory (PCM), and other advanced and staid memory technologies.

The data storage device 110 further includes a non-volatile cache 106 that is either a storage area on the storage media 114 or another non-volatile memory accessible by the data storage device 110. Storage space on the storage media 114 includes at least a main store or memory 108 and a non-volatile cache 106. The non-volatile cache 106 is either a storage area on the storage media 114 and/or another non-volatile memory accessible by the storage device 110. In one implementation, the non-volatile cache 106 is separate from (e.g., does not overlap) the main store 108. For example, the non-volatile cache 106 may be included in an overprovisioned region separate from the main store 108. Some implementations may cache data in one or more separate storage regions of multiple types of non-volatile memory and/or volatile memory. In the depicted system 100, the cache 106 is a storage area on the storage media 114.

The data storage device 110 further includes a read data register 116, a read cache register 118, a program data register 120, and a program cache register 122. In the disclosed technology, the read data register 116 and the read cache register 118 will only be used for read operations. The program data register 120 and the program cache register 122 will only be used for program operations. The program data register 118 will program the program data to the memory 108 (e.g., a flash array). The read data register 116 will read data from the memory 108 (e.g., a flash array). The disclosed technology allows the memory 108 to perform data transfer with a storage controller 112 and access (e.g., read data or write data) the memory 108 (e.g., a flash array) in parallel for same or different consecutive data commands.

For purposes of this disclosure, the "data" is only used for the read data register and the read cache register. The "program data" is only used for the program data register and the program cache register.

In some implementations, commands like a "change write column" command, a "change read column" command, a "change read column enhanced" command, etc. may be carried out on respective cache registers. For example, a change write column command may be carried out on the program cache register. In other examples, a change read column command and a change read column enhanced command may be carried out on the read cache register.

In some implementations, a copy back family of commands can be modified to support the disclosed four register layout. In some implementations, a command may be tailored to copy data between a read cache register and a program cache register.

Figure 2:
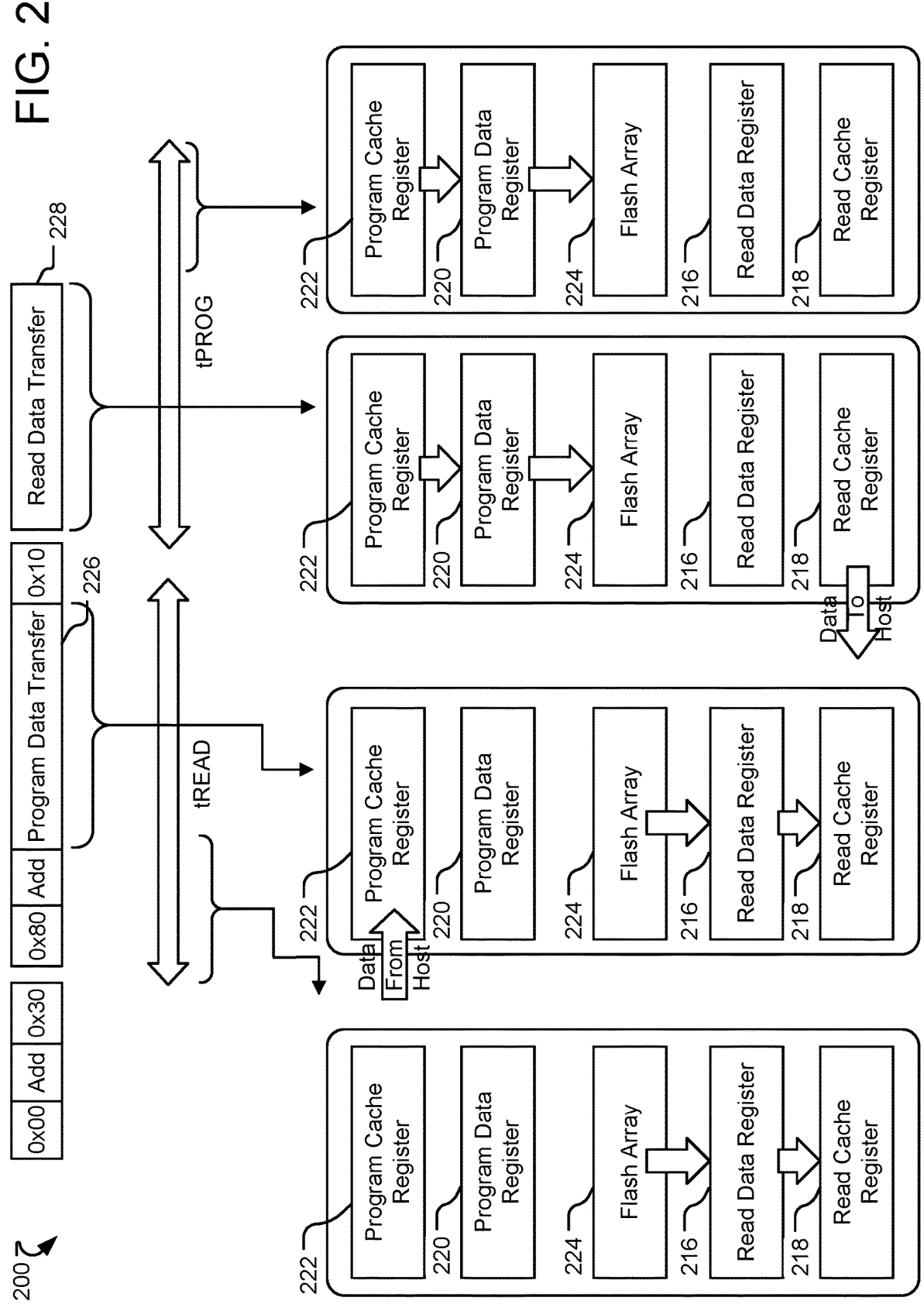
FIG. 2 is a schematic diagram of an example data storage system with separate data and cache registers when a program command is followed by a read command.

FIG. 2 is a schematic diagram of an example data storage system 200 with separate data and cache registers (e.g., a read data register 216, a read cache register 218, a program data register 220, and a program cache register 222) when a read command is followed by a program command. For purposes of illustration, the example in FIG. 2 includes flash memory (e.g., flash array 224).

A read command may be received, and subsequently, a program command may be received. The controller may read data for the read command from a flash array 224 to the read data register 216. At the same time the controller reads data for the read command, program data for the program command may be transferred from a storage controller (shown in FIG. 1, storage controller 112) to the program cache register 222 during Program Data Transfer 226.

The data from the read data register 216 is copied to the read cache register 218. The controller (not shown) may read the read command data from the read cache register 218 and program the programming data from the program command in the program cache register 222 to the flash array 224 at the same time, as shown with read data transfer block 228.

Figure 3:
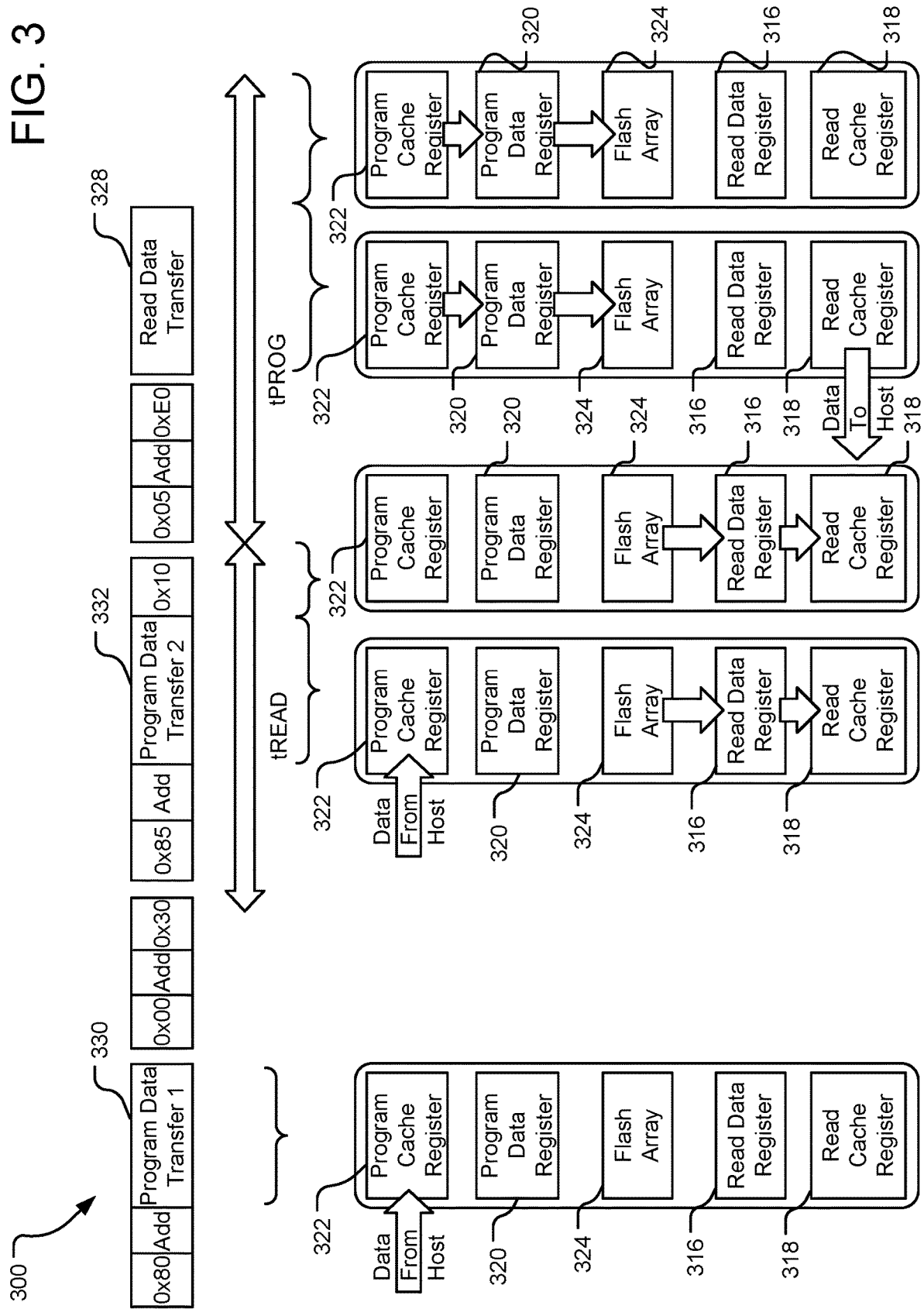
FIG. 3 is a schematic diagram of an example data storage system with separate data and cache registers when a read command is followed by a program command.

FIG. 3 is a schematic diagram of an example data storage system 300 with separate data and cache registers (e.g., a read data register 316, a read cache register 318, a program data register 320, and a program cache register 322) when program command is followed by a read command. For purposes of illustration, the example in FIG. 3 includes flash memory.

A program command may be received, and the controller can transfer data. A read command may be received at the same time the data is transferring. The controller may pause, or stop, data transfer to the program cache register 322 responsive to receiving the read command. The controller may send the read command, and the remaining data of the program command may be transferred.

For example, there may be a case where there is 16 KB of data that needs to be transferred for programming. After transferring approximately 10 KB from the data storage controller, the storage controller may receive a read command. The data transfer may be paused, and the Program Data Transfer 1 330, as shown in FIG. 3, is the 10 KB data. The storage controller will send a read command. Then the storage controller will send the remaining program data which is 16 KB–10 KB (or 6 KB). The Program Data Transfer 2 332 in this example is 6 KB.

When the controller reads data for the read command from the flash array 324 to the read data register 316, at the same time, the data of the program command may be transferred from the storage controller (see FIG. 1, storage controller 112) to the program cache register 322. The controller can read command data from the read cache register 318 at the same time program the programming data in the program cache register 322 from the program command into the memory in a read data transfer 328.

Figure 4:
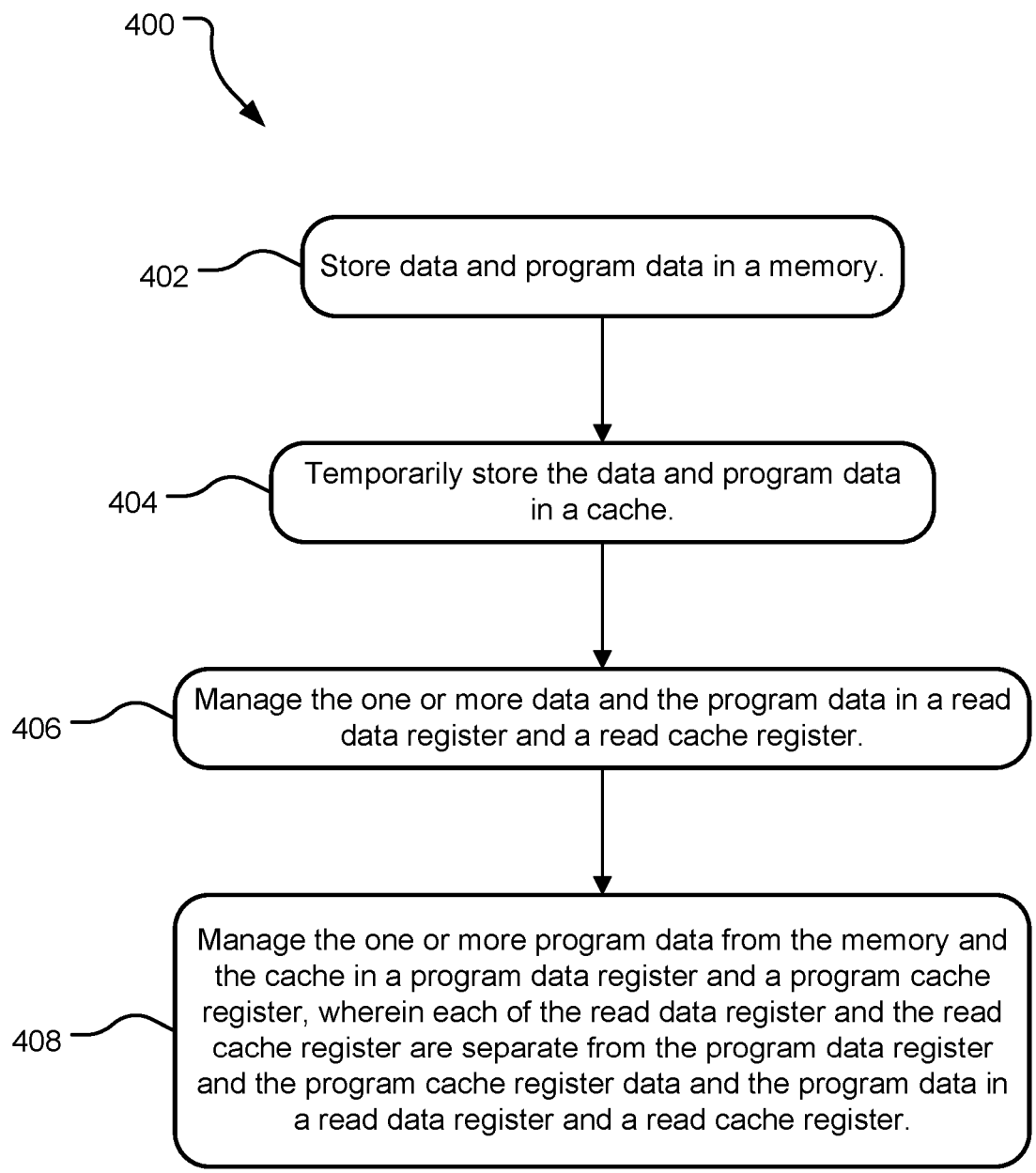
FIG. 4 is a flowchart of example operations of a data storage system with separate data and cache registers.

FIG. 4 is a flowchart of example operations 400 of a data storage system with separate data and cache registers. An operation 402 stores one or more data and program data in a memory. An operation 404 temporarily stores the one or more data and the program data in a cache. An operation 406 manages the one or more data from the memory and the cache in a read data register and a read cache register. An operation 408 manages the program data from the memory and the cache in a program data register and a program cache register, wherein each of the read data register and the read cache register are separate from the program data register and the program cache register.

Figure 5:
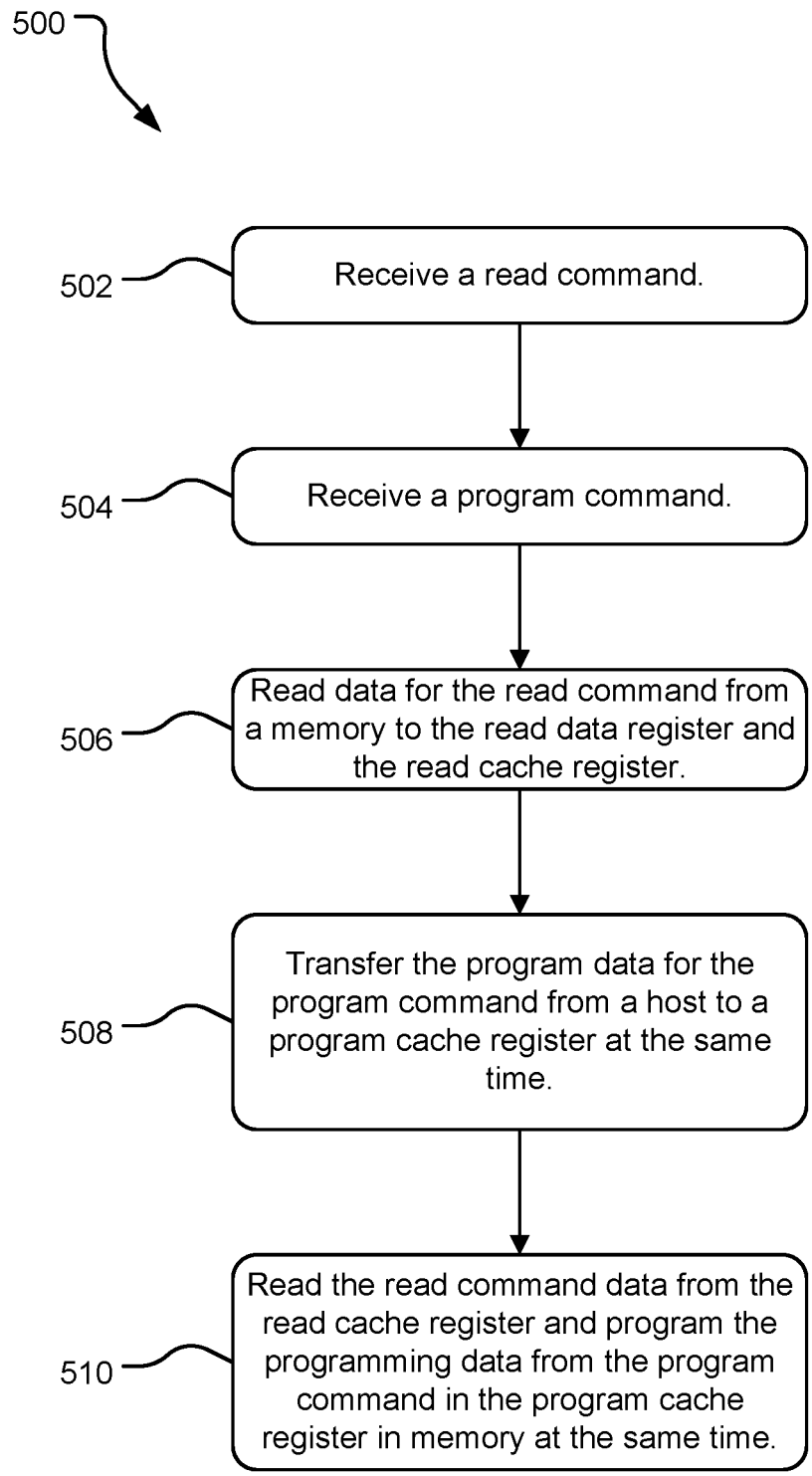
FIG. 5 is a flowchart of example operations of a data storage system with separate data and cache registers when a program command is followed by a read command.

FIG. 5 is a flowchart of example operations 500 of a data storage system with separate data and cache registers when a read command followed by a program command.

An operation 502 receives a read command. An operation 504 receives a program command. An operation 506 reads data for the read command from a memory to the read data register and transferring the program data for the program command from a storage controller to a program cache register at the same time. Read data is copied from the read data register to the read cache register. An operation 508 reads the read command data from the read cache register and program the programming data from the program cache register to the memory at the same time.

Figure 6:
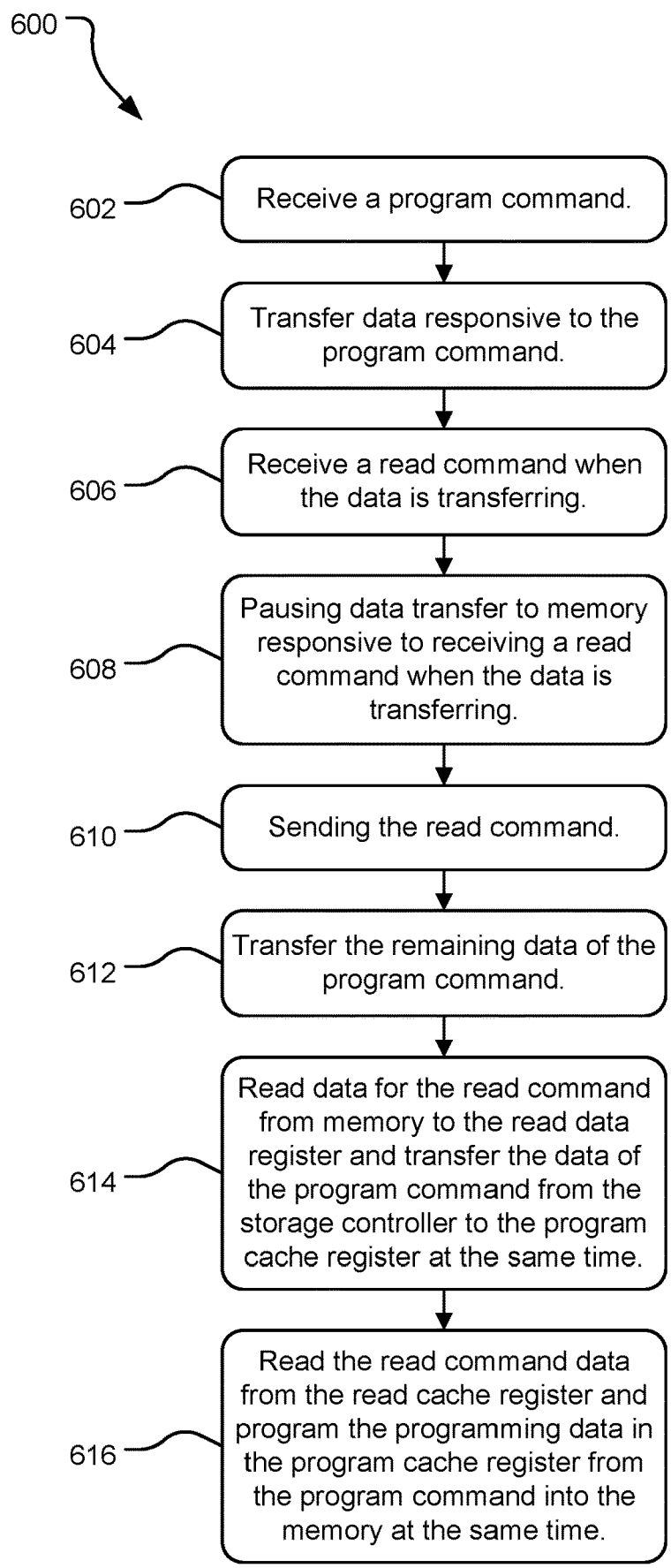
FIG. 6 is a flowchart of example operations of a data storage system with separate data and cache registers when a read command is followed by a program command.

FIG. 6 is a flowchart of example operations 600 of a data storage system with separate data and cache registers when a program command is followed by a read command.

An operation 602 receives a program command. An operation 604 transfers data responsive to the program command. An operation 606 receives a read command. An operation 608 pauses data transfer to memory responsive to receiving a read command. An operation 610 sends the read command. An operation 612 transfers the remaining data of the program command.

An operation 614 reads data for the read command from memory to the read data register and transferring the data of the program command from the storage controller to the program cache register at the same time. Read data is copied from the read data register to the read cache register. An operation 616 reads the read command data from the read cache register and program the program command data from the program cache register to the memory at the same time.

Figure 7:
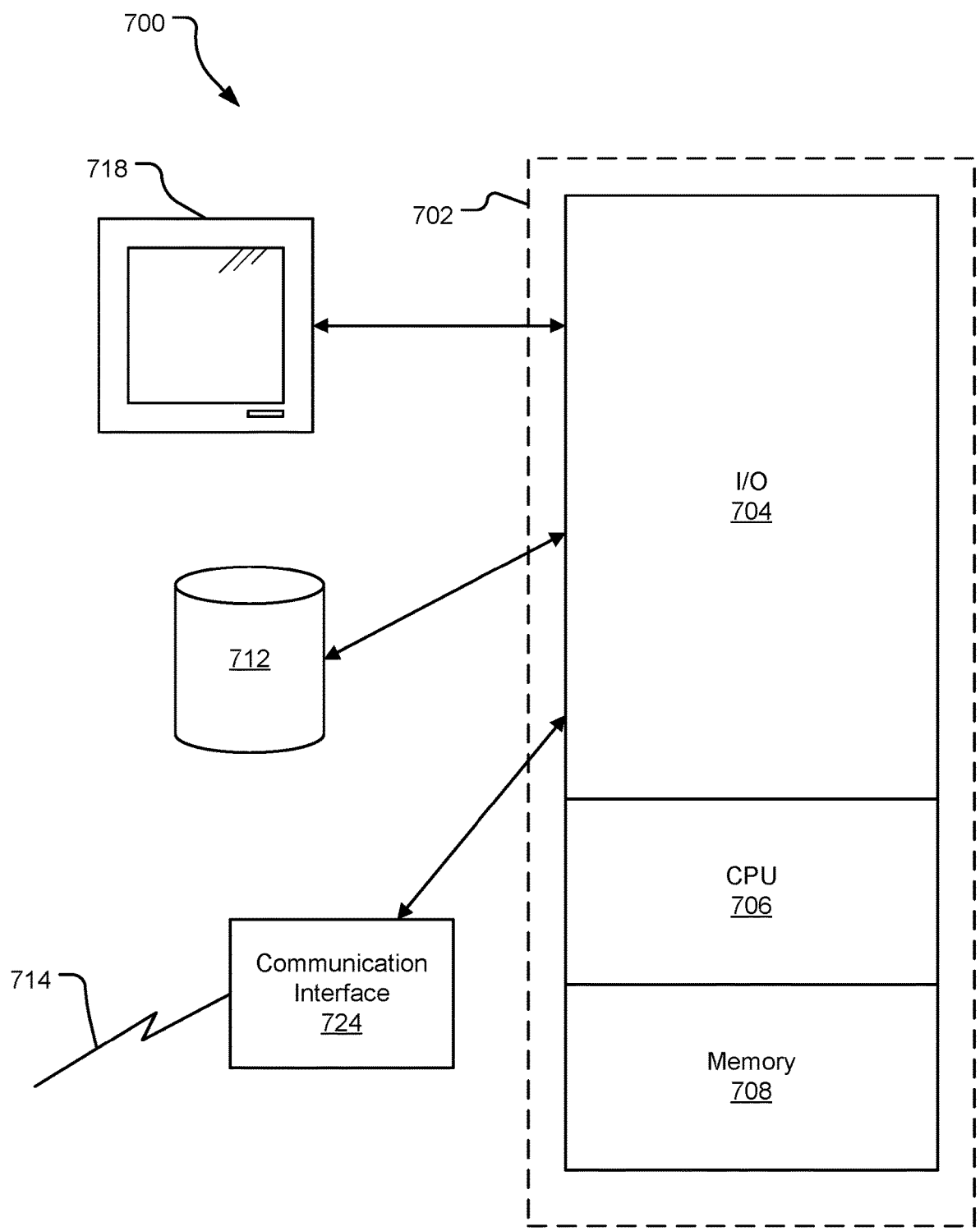
FIG. 7 is a block diagram of an example computer system suitable for implementing the technology disclosed herein.

FIG. 7 illustrates an example processing system 700 that may be useful in implementing the described technology. The processing system 700 is capable of executing a computer program product embodied in a tangible computer-readable storage medium to execute a computer process.

Data and program files may be input to the processing system 700, which reads the files and executes the programs therein using one or more processors (CPUs or GPUs). Some of the elements of a processing system 700 are shown in FIG. 7 wherein a processor 702 is shown having an input/output (I/O) section 704, a Central Processing Unit (CPU) 706, and a memory section 708. There may be one or more processors 702, such that the processor 702 of the processing system 700 comprises a single central-processing unit 706, or a plurality of processing units. The processors may be single core or multi-core processors. The processing system 700 may be a conventional computer, a distributed computer, or any other type of computer. The described technology is optionally implemented in software loaded in memory 708, a storage unit 712, and/or communicated via a wired or wireless network link 714 on a carrier signal (e.g., Ethernet, 3G wireless, 8G wireless, LTE (Long Term Evolution)) thereby transforming the processing system 700 in FIG. 7 to a special purpose machine for implementing the described operations. The processing system 700 may be an application specific processing system configured for supporting a distributed ledger. In other words, the processing system 700 may be a ledger node.

The I/O section 704 may be connected to one or more user-interface devices (e.g., a keyboard, a touch-screen display unit 718, etc.) or a storage unit 712. Computer program products containing mechanisms to effectuate the systems and methods in accordance with the described technology may reside in the memory section 708 or on the storage unit 712 of such a system 700.

A communication interface 724 is capable of connecting the processing system 700 to an enterprise network via the network link 714, through which the computer system can receive instructions and data embodied in a carrier wave. When used in a local area networking (LAN) environment, the processing system 700 is connected (by wired connection or wirelessly) to a local network through the communication interface 724, which is one type of communications device. When used in a wide-area-networking (WAN) environment, the processing system 700 typically includes a modem, a network adapter, or any other type of communications device for establishing communications over the wide area network. In a networked environment, program modules depicted relative to the processing system 700 or portions thereof, may be stored in a remote memory storage device. It is appreciated that the network connections shown are examples of communications devices for and other means of establishing a communications link between the computers may be used.

In an example implementation, a user interface software module, a communication interface, an input/output interface module, a ledger node, and other modules may be embodied by instructions stored in memory 708 and/or the storage unit 712 and executed by the processor 702. Further, local computing systems, remote data sources and/or services, and other associated logic represent firmware, hardware, and/or software, which may be configured to assist in supporting a distributed ledger. A ledger node system may be implemented using a general-purpose computer and specialized software (such as a server executing service software), a special purpose computing system and specialized software (such as a mobile device or network appliance executing service software), or other computing configurations. In addition, keys, device information, identification, configurations, etc. may be stored in the memory 708 and/or the storage unit 712 and executed by the processor 702.

The processing system 700 may be implemented in a device, such as a user device, storage device, IoT device, a desktop, laptop, computing device. The processing system 700 may be a ledger node that executes in a user device or external to a user device.

In addition to methods, the embodiments of the technology described herein can be implemented as logical steps in one or more computer systems. The logical operations of the present technology can be implemented (1) as a sequence of processor-implemented steps executing in one or more computer systems and/or (2) as interconnected machine or circuit modules within one or more computer systems. Implementation is a matter of choice, dependent on the performance requirements of the computer system implementing the technology. Accordingly, the logical operations of the technology described herein are referred to variously as operations, steps, objects, or modules. Furthermore, it may be understood that logical operations may be performed in any order, unless explicitly claimed otherwise or unless a specific order is inherently necessitated by the claim language.

Data storage and/or memory may be embodied by various types of processor-readable storage media, such as hard disc media, a storage array containing multiple storage devices, optical media, solid-state drive technology, ROM, RAM, and other technology. The operations may be implemented processor-executable instructions in firmware, software, hard-wired circuitry, gate array technology and other technologies, whether executed or assisted by a microprocessor, a microprocessor core, a microcontroller, special purpose circuitry, or other processing technologies. It may be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random-access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

The above specification, examples, and data provide a complete description of the structure and use of example embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A data storage device, comprising:
a memory to store a first portion data;
a cache to temporarily store the first portion of data;
a read data register dedicated to managing the first portion of data when read from the memory and a read cache register dedicated to managing the first portion of data when read from the cache; and a program data register dedicated to managing a second portion of data when written to the memory and a program cache register dedicated to managing the second portion of data when written to the cache, wherein each of the read data register, the read cache register, the program data register, and the program cache register are separate and operative to receive a read command for reading the first portion of data from the memory and a program command for writing the second portion of data to the memory sequentially in any order, and in response to the receiving the read command and the program command:
   reading the first portion of data for the read command from the memory to the read data register and transferring the second portion of data for the program command from a storage controller to the program cache register at the same time, and
   reading the first portion of data for the read command from the read data register to the read cache register and programming the second portion of data for the program command from the program cache register to the memory at the same time.

2. The storage device of claim 1, wherein the read data register and the read cache register are used for read operations.

3. The storage device of claim 1, wherein the program data register and the program cache register are used for program operations.

4. The storage device of claim 1, wherein the memory is a solid-state memory.

5. A method, comprising:
   storing a first portion of data in a memory;
   temporarily storing the first portion of data in a cache;
   managing the first portion data when read from the memory by a dedicated read data register for reading the first portion of data from the memory and managing the first portion of data when read from the cache by a dedicated read cache register for reading the first portion of data from the cache;
   managing a second portion of data when written to the memory from a dedicated program data register for writing the second portion of data to the memory and managing the second portion of data when written to the cache from a dedicated program cache register for writing the second portion of data to the cache, wherein each of the read data register, the read cache register, the program data register, and the program cache register are separate;
   receiving a read command for reading the first portion of data from the memory and a program command for writing the second portion of data to the memory sequentially in any order; and
   in response to the receiving the read command and the program command:
      reading the first portion of data for the read command from the memory to the read data register and transferring the second portion of data for the program command from a storage controller to the program cache register at the same time, and
      reading the first portion of data for the read command from the read data register to the read cache register and programming the second portion of data for the program command from the program cache register to the memory at the same time.

6. The method of claim 5, further comprising:
performing read operations with the read data register and the read cache register.

7. The method of claim 5, further comprising:
performing program operations with the program data register and the program cache register.

8. The method of claim 5, further comprising:
receiving the program command after receiving the read command.

9. The method of claim 5, further comprising:
transferring the second portion of data from a storage controller to the memory responsive to the program command;
receiving the read command during the time the second portion of data is transferring;
pausing the transfer of the second portion of data to the memory responsive to receiving the read command;
sending the read command subsequent to pausing the data transfer of the second portion of data; and
transferring the remaining second portion of data of the program command after the read command is sent.

10. One or more non-transitory computer-readable storage media encoding computer-executable instructions for executing on a computer system a computer process, the computer process comprising:
   storing a first portion of data in a memory;
   temporarily storing the first portion of data in a cache;
   managing the first portion of data when read from the memory by a dedicated read data register for reading the first portion of data from the memory and managing the first portion of data when read from the cache by a dedicated read cache register for reading the first portion of data from the cache;
   managing a second portion of data when written to the memory from a dedicated program data register for writing the second portion of data to the memory and managing the second portion of data when written to the cache from a dedicated program cache register for writing the second portion of data to the cache, wherein each of the read data register, the read cache register, the program data register, and the program cache register are separate;
   receiving a read command for reading the first portion of data and a program command for writing the second portion of data to the memory sequentially in any order; and
   in response to the receiving the read command and the program command:
      reading the first portion of data for the read command from the memory to the read data register and transferring the second portion of data for the program command from a storage controller to the program cache register at the same time, and
      reading the first portion of data for the read command from the read data register to the read cache register and programming the second portion of data for the program command from the program cache register to the memory at the same time.

11. The computer process of claim 10, further comprising:
performing read operations with the read data register and the read cache register.

12. The computer process of claim 10, further comprising:
performing program operations with the program data register and the program cache register.

13. The computer process of claim 10, further comprising:
receiving the program command subsequent to receiving the read command.

14. The computer process of claim 10, further comprising:
transferring the second portion of data responsive to receiving the program command;

receiving the read command during the time the first portion of data is transferring;

pausing the transfer of the second portion of data to memory responsive to receiving the read command;

sending the read command subsequent to pausing the data transfer of the second portion of data; and transferring the remaining second portion of data of the program command after the read command is sent.

* * * * *